United States Patent
Dutt

(10) Patent No.: US 10,278,336 B2
(45) Date of Patent: May 7, 2019

(54) SIMULATED TREE TRUNK PLANTER HAVING A NATURAL APPEARANCE AND METHOD OF USING SAME

(71) Applicant: Jeremy S. Dutt, Mount Bethel, PA (US)

(72) Inventor: Jeremy S. Dutt, Mount Bethel, PA (US)

( * ) Notice: Subject to any disclaimer, the term of this patent is extended or adjusted under 35 U.S.C. 154(b) by 430 days.

(21) Appl. No.: 15/088,693

(22) Filed: Apr. 1, 2016

(65) Prior Publication Data

US 2017/0280632 A1 Oct. 5, 2017

(51) Int. Cl.
 *A01G 9/02* (2018.01)
 *A01G 9/029* (2018.01)
 *H02J 7/35* (2006.01)
 *H02S 40/38* (2014.01)
 *H02S 20/10* (2014.01)
 *A01G 9/00* (2018.01)

(52) U.S. Cl.
 CPC ............ *A01G 9/0291* (2018.02); *A01G 9/00* (2013.01); *A01G 9/022* (2013.01); *H02J 7/35* (2013.01); *H02S 20/10* (2014.12); *H02S 40/38* (2014.12)

(58) Field of Classification Search
 CPC .......... A01G 9/00; A01G 9/02; A01G 9/0291; A01G 9/022; A01G 9/26; A01G 2025/006; A01G 25/02; A01G 27/001; A01G 27/003; A01G 27/005
 See application file for complete search history.

(56) References Cited

U.S. PATENT DOCUMENTS

| | | | |
|---|---|---|---|
| 2,900,759 A | 8/1959 | Hutchinson | |
| 4,389,813 A | 6/1983 | Jaques et al. | |
| 4,756,120 A * | 7/1988 | Arledge | A01G 31/06 47/59 R |
| 5,385,590 A * | 1/1995 | Sledge | A01G 27/001 47/62 R |
| 5,555,676 A * | 9/1996 | Lund | A01G 9/022 47/82 |
| 5,724,768 A * | 3/1998 | Ammann, Jr. | A01G 31/02 47/59 R |
| 5,782,453 A | 7/1998 | Tuzza et al. | |

(Continued)

FOREIGN PATENT DOCUMENTS

| | | | |
|---|---|---|---|
| JP | 10000031 A * | 1/1998 | |
| JP | 11206534 A * | 8/1999 | |

*Primary Examiner* — Son T Nguyen
(74) *Attorney, Agent, or Firm* — James R. McDaniel

(57) ABSTRACT

A simulated tree trunk planter, comprising: a simulated tree trunk such that the simulated tree trunk includes a natural appearance located on an outer surface of the tree trunk; wherein a lower end of the trunk includes a stabilizing plate operatively connected at one side to the lower end of the tree trunk and a tree anchor operatively connected at one end to the other side of the stabilizing plate; wherein the upper end of the trunk includes a simulated tree trunk planter receptacle having receptacle retainers, a receptacle lattice operatively connected to the receptacle retainers, and foliage such that the foliage is retained in place by the receptacle retainers and the receptacle lattice; and a plurality of attachment panel systems located on a section of the tree trunk, wherein a plurality of trunk attachments is secured to the tree trunk through the use of the attachment panel systems.

10 Claims, 9 Drawing Sheets

(56) References Cited

U.S. PATENT DOCUMENTS

| | | | |
|---|---|---|---|
| 5,867,938 A | 2/1999 | DiLernia | |
| 6,092,332 A * | 7/2000 | Roess | A01G 9/02 47/47 |
| 6,374,542 B1 | 4/2002 | Polito | |
| D461,917 S | 8/2002 | Horvath | |
| 6,443,849 B1 * | 9/2002 | Byrd | A63B 9/00 472/116 |
| 6,513,284 B1 * | 2/2003 | Sandlin | A01G 9/022 232/39 |
| 6,789,916 B2 * | 9/2004 | Ruggles | A01G 9/02 248/156 |
| 7,516,574 B2 * | 4/2009 | Gottlieb | A01G 9/023 47/62 R |
| 7,921,601 B2 | 4/2011 | Henry et al. | |
| D726,583 S | 4/2015 | Thomason et al. | |
| 2007/0033866 A1 * | 2/2007 | Henry | A01G 9/022 47/40.5 |
| 2009/0090051 A1 * | 4/2009 | Hogan | A01G 27/003 47/66.6 |
| 2009/0090895 A1 * | 4/2009 | Hogan, Jr. | A01G 9/022 254/266 |
| 2009/0183429 A1 * | 7/2009 | Kim | A01G 9/02 47/66.1 |
| 2011/0148124 A1 * | 6/2011 | Soejima | A01G 7/02 290/1 R |
| 2012/0047801 A1 * | 3/2012 | Hogan | A01G 9/022 47/66.6 |
| 2012/0181973 A1 * | 7/2012 | Lyden | B60L 11/182 320/101 |
| 2014/0318007 A1 * | 10/2014 | Hogan | F16M 11/18 47/39 |
| 2015/0020449 A1 | 1/2015 | Suchecki | |

\* cited by examiner

SIMULATED TREE TRUNK PLANTER HAVING A NATURAL APPEARANCE AND METHOD OF USING SAME

FIELD OF THE INVENTION

This invention relates generally to simulated tree trunk planters and more particularly to a simulated tree trunk planter that has a natural appearance which serves as a planter for a live tree and/or plant and includes various electrical and plumbing connections that are capable of being connected to a variety of electrical and plumbing attachments which can be utilized on the simulated tree trunk planter.

BACKGROUND OF THE INVENTION

Prior to the present invention, as set forth in general terms above and more specifically below, it is known, to employ various simulated tree trunk planters. See for example, U.S. Pat. D461,917 by Horvath, U.S. Pat. D726,583 by Thomason et al., U.S. Pat. No. 2,900,759 by Hutchinson, U.S. Pat. No. 4,389,813 by Jaques et al., U.S. Pat. No. 5,782,453 by Tuzza et al., U.S. Pat. No. 5,867,938 by DiLemia, U.S. Pat. No. 6,374,542 by Polito, U.S. Pat. No. 7,921,601 by Henry et al., and U.S. Patent Application No. 2015/0020449 by Suchecki. While these various simulated tree trunk planters may have been generally satisfactory, there is nevertheless a need in the simulated tree trunk planter art for a new and improved simulated tree trunk planter that has a natural appearance which serves as a planter for a live tree and/or plant and includes various electrical and plumbing connections that are capable of being connected to a variety of electrical and plumbing attachments which can be utilized on the simulated tree trunk planter.

It is a purpose of this invention to fulfill this and other needs in the simulated tree planter art in a manner more apparent to the skilled artisan once given the following disclosure.

SUMMARY OF THE INVENTION

A first aspect of the present invention is a simulated tree trunk planter, comprising: a simulated tree trunk having a lower end and an upper end such that the simulated tree trunk includes a natural appearance located on an outer surface of the simulated tree trunk, wherein the natural appearance makes the simulated tree trunk appear to look like a real life tree; wherein the lower end includes a stabilizing plate operatively connected at one side to the lower end of the simulated tree trunk and a tree anchor operatively connected at one end to the other side of the stabilizing plate; wherein the upper end includes a simulated tree trunk planter receptacle having receptacle retainers, a receptacle lattice operatively connected to the receptacle retainers, and foliage such that the foliage is retained in place by the receptacle retainers and the receptacle lattice; and a plurality of tree trunk planter attachment panel systems located on a section of the simulated tree trunk, wherein a plurality of tree trunk planter attachments is secured to the simulated tree trunk through the use of the plurality of tree trunk planter attachment panel systems.

In one embodiment of the first aspect of the present invention, the simulated tree trunk is further comprised of: at least one electrical conduit located within an interior of the simulated tree trunk such that the electrical conduit extends from the lower end to the upper end and includes electrical wiring located within the at least one electrical conduit; and at least one plumbing conduit located within an interior of the simulated tree trunk such that the plumbing conduit extends from the lower end to the upper end.

In another embodiment of the first aspect of the present invention, the lower end is further comprised of: at least one external electrical port located on the outer surface of the simulated tree trunk and operatively connected to the at least one electrical conduit; at least one external plumbing port located on the outer surface of the simulated tree trunk and operatively connected to the at least one plumbing conduit; and at least one drainage hole.

In yet another embodiment of the first aspect of the present invention, the stabilizing plate is a circular plate.

In still yet another embodiment of the first aspect of the present invention, the tree anchor is further comprised of a plurality of teeth operatively connected at the other end of tree anchor.

In a further embodiment of the first aspect of the present invention, the upper end is further comprised of: a plurality of tree trunk planter receptacles having an outer surface that includes the natural appearance, wherein the plurality of tree trunk planter receptacles includes a plurality of receptacle retainers, receptacle lattice, a liquid applicator, and a plurality of planter receptacle drainage holes, wherein the receptacle lattice is operatively connected to the plurality of receptacle retainers such that foliage can be located within the plurality of tree trunk planter receptacles and retained by the plurality of receptacle retainers and receptacle lattice; and a waterproof seal located between the plurality of tree trunk planter receptacles and the upper end of the simulated tree trunk.

In a yet further embodiment of the first aspect of the present invention, the upper end is further comprised of: a plurality of photovoltaic panels each located on one end of each of the plurality of receptacle retainers; a battery located within the interior of the simulated tree trunk and operatively connected to the plurality of photovoltaic panels and the at least one electrical conduit; and a timer located within the interior of the simulated tree trunk and operatively connected to the battery, the at least one electrical conduit, and the at least one plumbing conduit.

In a still further another embodiment of the first aspect of the present invention, the liquid applicator is further comprised of: a water drip hose.

In an even further another embodiment of the first aspect of the present invention, at least one of the plurality of tree trunk planter attachment panel systems is further comprised of: an attachment panel; an attachment panel seal located on one side to the attachment panel and positioned around a perimeter of the attachment panel; and an attachment box operatively connected to the simulated tree trunk and located on the other side of the attachment panel and adjacent to the attachment panel seal, wherein the attachment box includes a plurality of openings such that at least one of the plurality of tree trunk planter attachments can be secured to the attachment box through the use of the plurality of openings.

In still even further another embodiment of the first aspect of the of the present invention, the plurality of tree trunk planter attachments is further comprised of: a street light system.

A second aspect of the present invention is a simulated planter, comprising: a simulated tree trunk having a lower end and an upper end such that the simulated tree trunk includes a natural appearance located on an outer surface of the simulated tree trunk, wherein the natural appearance makes the simulated tree trunk appear to look like a real life tree, wherein the simulated tree trunk includes at least one electrical conduit located within an interior of the simulated tree trunk such that the electrical conduit extends from the lower end to the upper end and includes electrical wiring located within the at least one electrical conduit and at least one plumbing conduit located within an interior of the simulated tree trunk such that the plumbing conduit extends from the lower end to the upper end; wherein the lower end includes a stabilizing plate operatively connected at one side to the lower end of the simulated tree trunk and a tree anchor operatively connected at one end to the other side of the stabilizing plate; wherein the upper end includes a simulated tree trunk planter receptacle having receptacle retainers, a receptacle lattice operatively connected to the receptacle retainers, and foliage such that the foliage is retained in place by the receptacle retainers and the receptacle lattice; and a plurality of tree trunk planter attachment panel systems located on a section of the simulated tree trunk, wherein a plurality of tree trunk planter attachments is secured to the simulated tree trunk through the use of the plurality of tree trunk planter attachment panel systems.

In one embodiment of the second aspect of the present invention, the lower end is further comprised of: at least one external electrical port located on the outer surface of the simulated tree trunk and operatively connected to the at least one electrical conduit; at least one external plumbing port located on the outer surface of the simulated tree trunk and operatively connected to the at least one plumbing conduit; and at least one drainage hole.

In another embodiment of the second aspect of the present invention, the stabilizing plate is a circular plate.

In another embodiment of the second aspect of the present invention, the tree anchor is further comprised of a plurality of teeth operatively connected at the other end of tree anchor.

In another embodiment of the second aspect of the present invention, the upper end is further comprised of: a plurality of tree trunk planter receptacles having an outer surface that includes the natural appearance, wherein the plurality of tree trunk planter receptacles includes a plurality of receptacle retainers, receptacle lattice, a liquid applicator, and a plurality of planter receptacle drainage holes, wherein the receptacle lattice is operatively connected to the plurality of receptacle retainers such that foliage can be located within the plurality of tree trunk planter receptacles and retained by the plurality of receptacle retainers and receptacle lattice; and a waterproof seal located between the plurality of tree trunk planter receptacles and the upper end of the simulated tree trunk.

In yet another embodiment of the second aspect of the present invention, the upper end is further comprised of: a plurality of photovoltaic panels each located on one end of each of the plurality of receptacle retainers; a battery located within the interior of the simulated tree trunk and operatively connected to the plurality of photovoltaic panels and the at least one electrical conduit; and a timer located within the interior of the simulated tree trunk and operatively connected to the battery, the at least one electrical conduit, and the at least one plumbing conduit.

In still yet another embodiment of the second aspect of the present invention, at least one of the plurality of tree trunk planter attachment panel systems is further comprised of: an attachment panel; an attachment panel seal located on one side to the attachment panel and positioned around a perimeter of the attachment panel; and an attachment box operatively connected to the simulated tree trunk and located on the other side of the attachment panel and adjacent to the attachment panel seal, wherein the attachment box includes a plurality of openings such that at least one of the plurality of tree trunk planter attachments can be secured to the attachment box through the use of the plurality of tree trunk planter attachment panel systems.

In a third aspect of the present invention is a planting container with the simulated look of a natural tree, comprising: a simulated tree trunk having a lower end and an upper end such that the simulated tree trunk includes a natural appearance located on an outer surface of the simulated tree trunk, wherein the natural appearance makes the simulated tree trunk appear to look like a real life tree, wherein the simulated tree trunk includes at least one electrical conduit located within an interior of the simulated tree trunk such that the electrical conduit extends from the lower end to the upper end and includes electrical wiring located within the at least one electrical conduit and at least one plumbing conduit located within an interior of the simulated tree trunk such that the plumbing conduit extends from the lower end to the upper end; wherein the lower end includes a stabilizing plate operatively connected at one side to the lower end of the simulated tree trunk and a tree anchor operatively connected at one end to the other side of the stabilizing plate; wherein the upper end includes a simulated tree trunk planter receptacle having receptacle retainers, a receptacle lattice operatively connected to the receptacle retainers, and foliage such that the foliage is retained in place by the receptacle retainers and the receptacle lattice; and a plurality of tree trunk planter attachment panel systems located on a section of the simulated tree trunk, wherein a plurality of tree trunk planter attachments is secured to the simulated tree trunk through the use of the plurality of tree trunk planter attachment panel systems, wherein at least one of the plurality of tree trunk planter attachment panel systems includes an attachment panel, an attachment panel seal located on one side to the attachment panel and positioned around a perimeter of the attachment panel; and an attachment box operatively connected to the simulated tree trunk and located on the other side of the attachment panel and adjacent to the attachment panel seal, wherein the attachment box includes a plurality of openings such that at least one of the plurality of tree trunk planter attachments can be secured to the attachment box.

In an embodiment of the third aspect of the present invention, the lower end is further comprised of: at least one external electrical port located on the outer surface of the simulated tree trunk and operatively connected to the at least one electrical conduit; at least one external plumbing port located on the outer surface of the simulated tree trunk and operatively connected to the at least one plumbing conduit; and at least one drainage hole.

In another embodiment of the third aspect of the present invention, the upper end is further comprised of: a plurality of photovoltaic panels each located on one end of each of the plurality of receptacle retainers; a battery located within the interior of the simulated tree trunk and operatively connected to the plurality of photovoltaic panels and the at least one electrical conduit; and a timer located within the interior of the simulated tree trunk and operatively connected to the battery, the at least one electrical conduit, and the at least one plumbing conduit.

The preferred simulated tree trunk planter, according to various embodiments of the present invention, offers the following advantages: ease of use; portability; lightness in weight; a natural appearance; the ability to use a variety of electrical attachments; the ability to use a variety of plumbing attachments; the ability to be able to customize the simulated tree planter; the ability to use the simulated tree planter in a variety of different climates; and the ability to use the simulated tree planter in a variety of different terrains. In fact, in many of the preferred embodiments, these factors of ease of use, portability, lightness in weight, a natural appearance, the ability to use a variety of electrical attachments, the ability to use a variety of plumbing attachments, the ability to be able to customize the simulated tree planter, the ability to use the simulated tree planter in a variety of different climates, and the ability to use the simulated tree planter in a variety of different terrains are optimized to an extent that is considerably higher than heretofore achieved in prior, known simulated tree trunk planters.

BRIEF DESCRIPTION OF DRAWINGS

The above mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF PREFERRED EMBODIMENTS

Figure 1:
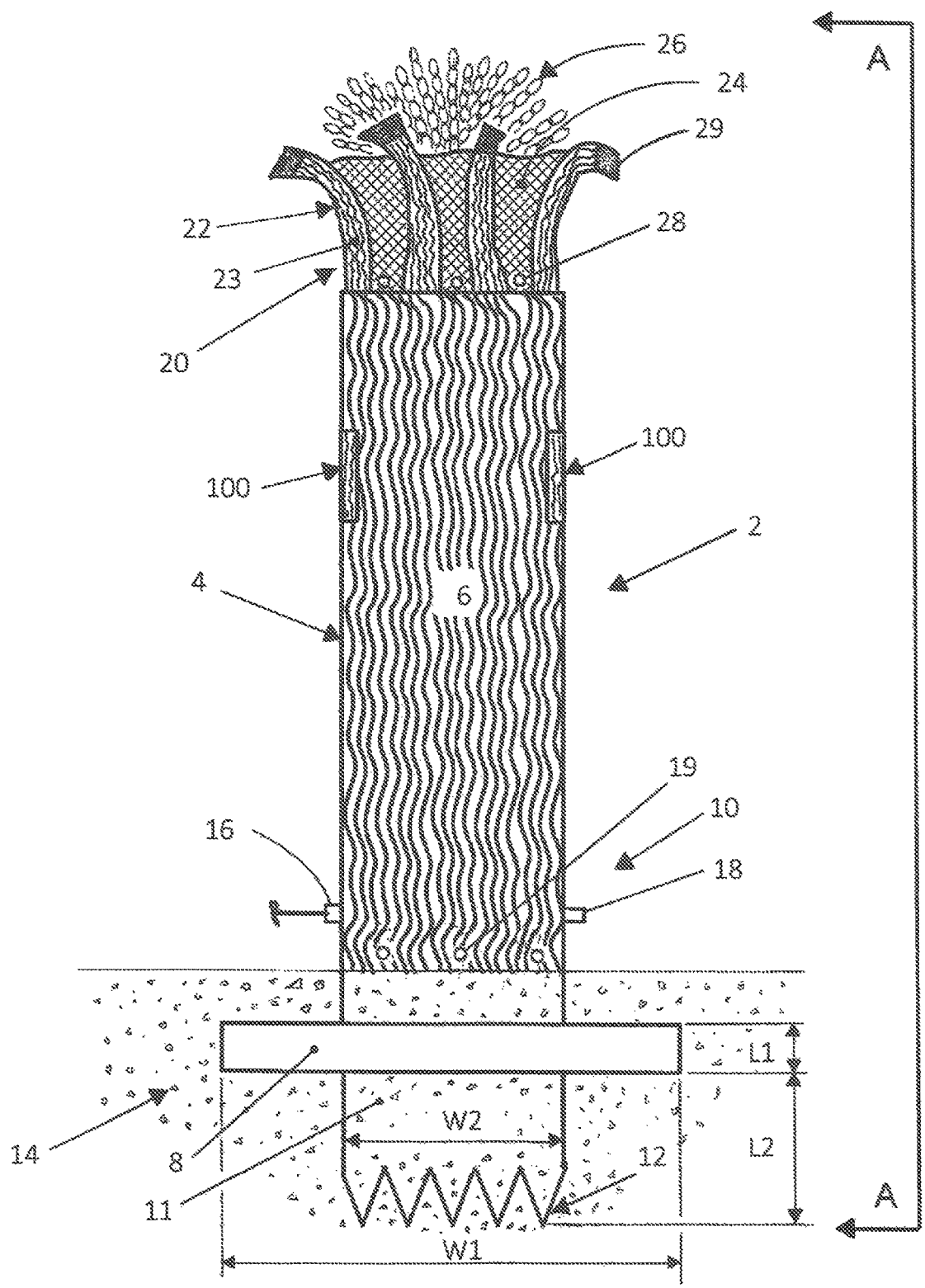
FIG. 1 is a front view of a simulated tree trunk planter having a natural appearance, constructed according to the present invention.

Referring now to the drawings and more particularly to FIG. 1, there is illustrated a simulated tree trunk planter 2, which is constructed in accordance with the present invention. As will be explained hereinafter in greater detail, the simulated tree trunk planter 2 is constructed such that it has a natural appearance which serves as a planter for a live tree and/or plant and includes various electrical and plumbing connections that are capable of being connected to a variety of electrical and plumbing attachments which can be utilized on the simulated tree trunk planter 2. The advantages of simulated tree trunk planter 2 are ease of use, portability, lightness in weight, a natural appearance, the ability to use a variety of electrical attachments, the ability to use a variety of plumbing attachments, the ability to be able to customize the simulated tree planter, the ability to use the simulated tree planter in a variety of different climates, and the ability to use the simulated tree planter in a variety of different terrains.

Considering now the simulated tree trunk planter 2, in greater detail with reference to FIG. 1, the simulated tree trunk planter 2 generally includes a lower end 10, an upper end 20, and tree trunk planter attachment panel system 100.

Considering now the simulated tree trunk planter 2, in greater detail with reference to FIG. 1, the simulated tree trunk planter 2 generally includes along the lower end 10 of simulated tree trunk planter 2, a simulated tree trunk 4 having a natural appearance 6, stabilizing plate 8, tree anchor 11 having tree anchor teeth 12 which interact with terrain 14, external electrical port 16, external plumbing port 18 and drainage holes 19.

Considering now simulated tree trunk 4, in greater detail, simulated tree trunk 4, preferably, is constructed of any suitable, durable, lightweight, haze resistant, high impact resistant, crack resistant, temperature resistant, wear resistant, and UV stabilized polymeric material that is capable of being formed into a simulated tree trunk. It is to be understood that the overall size of simulated tree trunk 4 can be varied so that a variety of different tree tops and/or plants 26 can be used with simulated tree trunk 4 and still maintain a realistic, natural look of simulated tree trunk planter 2. For example, if it is desired to add a palm tree to the top of simulated tree trunk planter 2, then simulated tree trunk 4 should be larger than if the end user desired to add a variety of plants that merely draped over the top of simulated tree trunk planter 2.

Considering now the natural appearance 6 of simulated tree trunk 4 with respect to FIG. 1, natural appearance 6 is created on the outer perimeter of simulated tree trunk 4, which is a key feature of the present invention. Preferably, natural appearance 6 can be formed onto the outside of simulated tree trunk 4 by any suitable, well known technique such as stamping, molding, casting, vacuum forming, and the like. One key to the present invention is that the natural appearance 6 should somewhat resemble the type of tree top and/or plant 26 that is being placed in the top of simulated tree trunk planter 2. For example, if it is desired to place simulated tree trunk planter 2 along a property that is near the ocean and the end user desires to install a real palm plant head in the top of simulated tree trunk planter 2, then the natural appearance 6 should be such that it place somewhat resembles the trunk of a palm tree. Conversely, if the simulated tree trunk planter 2 is to be located in an area adjacent to a hardwood forest, the end user may desire that the natural appearance 6 somewhat resemble a hardwood tree such as an oak tree so that simulated tree trunk planter 2 looks like the surrounding trees.

Considering now stabilizing plate 8 in greater detail with respect to FIG. 1, stabilizing plate 8, preferably, is used to stabilize simulated tree trunk 4. In this manner, once stabilizing plate 8 is located below a sufficient amount of terrain 14, which will be discussed in greater detail later, any movement of simulated tree trunk 4 will be minimized through the use stabilizing plate 8. Stabilizing plate 8, preferably, is constructed of any suitable, durable, lightweight, haze resistant, high impact resistant, crack resistant, temperature resistant, wear resistant, and UV stabilized material that is capable of stabilizing simulated tree trunk 4.

Also, it is to be understood that stabilizing plate 8, preferably, may be constructed of a material that is similar to the material that is used to construct simulated tree trunk 4. In this manner, simulated tree trunk 4 and stabilizing plate 8 may be constructed as a single unit. However, if stabilizing plate 8 is constructed of a material that is different than the material used to construct simulated tree trunk 4 then it is to be understood that the material used to construct stabilizing plate 8 must be able to be properly and conventionally secured to simulated tree trunk 4 through the use of adhesives, fusion bonding, welding, mechanical fasteners or the like.

With respect to the size of stabilizing plate 8, the width ($W_1$) of stabilizing plate 8, preferably, ranges from 12 inches to 60 inches. The thickness ($L_1$) of stabilizing plate 8, preferably, ranges from 1 inch to 6 inches. However, it is to be understood that the size of stabilizing plate 8, preferably, is determined by the overall size of simulated tree trunk planter 2. For example, if it is desired to only install small plants or a small tree top in the top of simulated tree trunk planter 2, then stabilizing plate 8 should have smaller overall dimensions than if a large palm plant head, for example, is to be placed in the top of simulated tree trunk planter 2.

With respect to the overall shape of stabilizing plate 8, preferably, stabilizing plate 8 has a circular shape. However, it is to be understood that the shape of stabilizing plate 8 can be varied so as to adjust for the type of terrain 14 and the overall size of simulated tree trunk planter 2.

Considering now tree anchor 11 in greater detail with respect to FIG. 1, tree anchor 11, preferably, is also used to stabilize simulated tree trunk 4. In particular, tree anchor 11 also interacts with terrain 14, which will be discussed in greater detail later, to substantially prevent any movement of simulated tree trunk 4. Tree anchor 11, preferably, is constructed of any suitable, durable, lightweight, haze resistant, high impact resistant, crack resistant, temperature resistant, wear resistant, and UV stabilized material that is capable of stabilizing simulated tree trunk 4. Also, it is to be understood that tree anchor 11, preferably, may be constructed of a material that is similar to the material that is used to construct simulated tree trunk 4 and stabilizing plate 8. In this manner, simulated tree trunk 4, stabilizing plate 8 and tree anchor 11 may be constructed as a single unit. However, if tree anchor 11 is constructed of a material that is different than the material used to construct simulated tree trunk 4 and/or stabilizing plate 8 then it is to be understood that the material used to construct tree anchor 11 must be able to be properly and conventionally secured to simulated tree trunk 4 and/or stabilizing plate 8 through the use of adhesives, fusion bonding, welding, mechanical fasteners or the like.

With respect to the size of tree anchor 11, the length ($L_2$) of tree anchor 11, preferably, ranges from 6 inches to 24 inches. The width ($W_2$) of tree anchor 11, preferably, ranges from 12 inches to 60 inches. However, it is to be understood that the size of tree anchor 11, preferably, is also determined by the overall size of simulated tree trunk planter 2. For example, if it is desired to only install small plants or a small tree top in the top of simulated tree trunk planter 2, then tree anchor 11 should have smaller overall dimensions than if a large palm plant head, for example, is to be placed in the top of simulated tree trunk planter 2.

Located along the bottom edge of tree anchor 11 are tree anchor teeth 12. Tree anchor teeth 12 are used to grip terrain 14 at the one end of tree anchor 11 to provide even more stabilization of simulated tree trunk 4. In particular, tree anchor teeth 12 further interact with terrain 14, which will be discussed in greater detail later, to substantially prevent any movement of simulated tree trunk 4. Preferably, tree anchor teeth 12 are constructed of the same material as tree anchor 11. However, it is to be understood that if tree anchor teeth 12 are constructed of a material that is different than the material used to construct tree anchor 11 then it is to be understood that the material used to construct tree anchor teeth 12 must be able to be properly and conventionally secured to tree anchor 11 through the use of adhesives, fusion bonding, welding, mechanical fasteners or the like. It is also to be understood that tree anchor teeth 12 may be able to be removed from tree anchor 11 in case tree anchor teeth 12 become damaged.

Considering now external electrical port 16 in greater detail with respect to FIG. 1, external electrical port 16, preferably, is used to connect simulated tree trunk 4 to conventional external electrical wiring (not shown) such that electricity can be supplied to simulated tree trunk 4. Preferably, external electrical port 16 is any suitable, durable, lightweight, haze resistant, high impact resistant, crack resistant, temperature resistant, wear resistant, and UV stabilized electrical connector that is capable of connecting the external conventional electrical wiring to the electrical wiring 32 (FIG. 2) located within simulated tree trunk 4, as will discussed in greater detail later.

Considering now external plumbing port 18 in greater detail with respect to FIG. 1, external plumbing port 18, preferably, is used to connect simulated tree trunk 4 to conventional external plumbing (not shown) such as a conventional water line wherein water or other liquids can be supplied to simulated tree trunk 4. Preferably, external plumbing port 18 is any suitable, durable, lightweight, haze resistant, high impact resistant, crack resistant, temperature resistant, wear resistant, and UV stabilized plumbing connector that is capable of connecting the external conventional plumbing to the plumbing conduit 34 (FIG. 2) located within simulated tree trunk 4, as will discussed in greater detail later.

Considering now drainage holes 19 in greater detail with respect to FIG. 1, drainage holes 19, preferably, are used to provide drainage for any liquids that may collect near the bottom of simulated tree trunk 4. It is to be understood that the location and size of drainage holes 19 can be varied. However, the location and size of drainage holes 19 should be such that debris or terrain 14 does not adversely affect the ability of liquids that have collected near the bottom of simulated tree trunk 4 to drain out of the bottom of simulated tree trunk 4.

Considering now the simulated tree trunk planter 2, in greater detail with reference to FIG. 1, the simulated tree trunk planter 2 generally includes along the upper end of simulated tree trunk planter receptacle 20 having a natural appearance 23. Simulated tree trunk planter receptacle 20 also includes receptacle retainers 22, receptacle lattice 24, tree and or plant 26, drainage holes 28, and solar or photovoltaic panels 29.

Considering now receptacle retainers 22, in greater detail with respect to FIG. 1, receptacle retainers 22, preferably, are constructed of any suitable, durable, lightweight, haze resistant, high impact resistant, crack resistant, temperature resistant, wear resistant, and UV stabilized polymeric material that is capable of retaining tree top and/or plant 26 within the top of simulated tree trunk planter 2. It is to be understood that the overall size of receptacle retainers 22 can be varied so that a variety of different tree tops and/or plants can be used with simulated tree trunk 4 and still maintain a realistic, natural look of simulated tree trunk planter 2. For example, if it is desired to add a palm tree top to the top of simulated tree trunk planter 2, then receptacle retainers 22 should be larger than if the end user desired to add a variety of plants that merely draped over the top of simulated tree trunk planter 2. Also, receptacle retainers 22 should somewhat resemble the branches of the tree that the planter 2 is trying to resemble. For example, if it is desired that planter 2 resemble an oak tree than receptacle retainers 22 should resemble somewhat the larger branches of an oak tree.

Considering now the natural appearance 23 with respect to FIG. 1, as discussed above with reference to natural appearance 6, natural appearance 23 is created on the outside of receptacle retainers 22, which is another key feature of the present invention. Preferably, natural appearance 23 can be formed onto the outside of receptacle retainers 22 by any suitable, well known technique such as stamping, molding, casting, vacuum forming, and the like. One key to the present invention is that the natural appearance 23 should somewhat resemble the type of tree top and/or plant that is being placed in the top of simulated tree trunk planter 2. For example, if it is desired to locate simulated tree trunk planter 2 along a property that is near the ocean and the end user desires to install a real palm plant head in the top of simulated tree trunk planter 2, then the natural appearance 23 should be such that it somewhat resembles the larger branches of a palm tree. Conversely, if the simulated tree trunk planter 2 is to be located in an area adjacent to a hardwood forest, the end user may desire that the natural appearance 23 somewhat resemble the larger branches of a hardwood tree such as an oak tree so that simulated tree trunk planter 2 looks like the surrounding trees.

Considering now receptacle lattice 24, in greater detail with respect to FIG. 1, receptacle lattice 24, preferably, is used to retain any tree and/or plant roots and the planting material surrounding the tree and/or plant roots. It is to be understood that webbing, netting, strapping or the like can be use in receptacle lattice 24 as long as it provides adequate retention of the tree and/or plant roots and the planting material surrounding the tree and/or plant roots. It is to be further understood that receptacle lattice 24 can also be constructed of any suitable, durable, lightweight, haze resistant, high impact resistant, crack resistant, temperature resistant, wear resistant, and UV stabilized material.

Considering now drainage holes 28 in greater detail with respect to FIG. 1, drainage holes 28, preferably, are used to provide drainage for any liquids that may collect within the bottom of tree top and/or plant 26. It is to be understood that the location and size of drainage holes 28 can be varied. However, the location and size of drainage holes 28 should be such that debris or roots from tree top and/or plant 26 does not adversely affect the ability of liquids that have collected at the bottom of tree top and/or plant 26 to drain away from tree top and/or plant 26.

Considering now solar or photovoltaic panels 29 in greater detail with respect to FIG. 1, solar or photovoltaic panels 29, preferably, are conventional solar or photovoltaic panels that can be used to provide an alternate power source to simulated tree trunk 4. Solar or photovoltaic panels 29 are conventionally attached to receptacle retainers 22. However, it is to be understood that solar or photovoltaic panels 29 should be placed on receptacle retainers 22 so as to be exposed to as much ambient light/sunlight as possible. As will be discussed in greater detail later, solar or photovoltaic panels 29 may be used to interact with the various electrical components attached to simulated tree trunk 4 in order to conventionally provide an alternate power source to those electrical components.

Considering now the simulated tree trunk planter 2, in greater detail with reference to FIG. 1, the simulated tree trunk planter 2 generally includes along a section of the simulated tree trunk planter 2, a plurality of tree trunk planter attachment panel systems 100. As will be discussed in greater detail later, a variety of tree trunk planter attachments can be secured to simulated tree trunk planter 2 through the use of tree trunk planter attachment panel systems 100.

Figure 2:
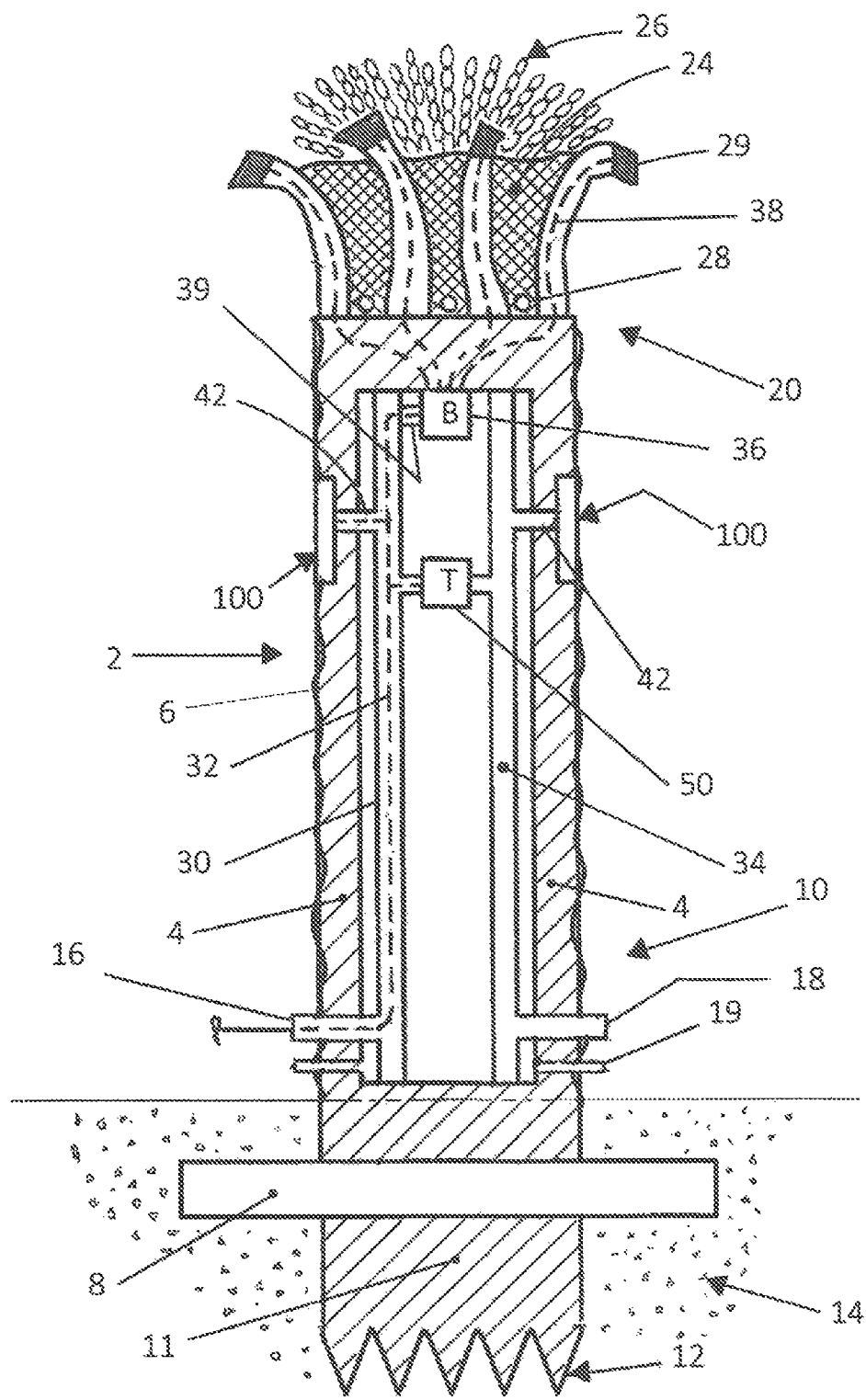
FIG. 2 is a vertical cross-section view through the simulated tree trunk planter of FIG. 1, taken along lines A-A, constructed according to the present invention.
Figure 3:
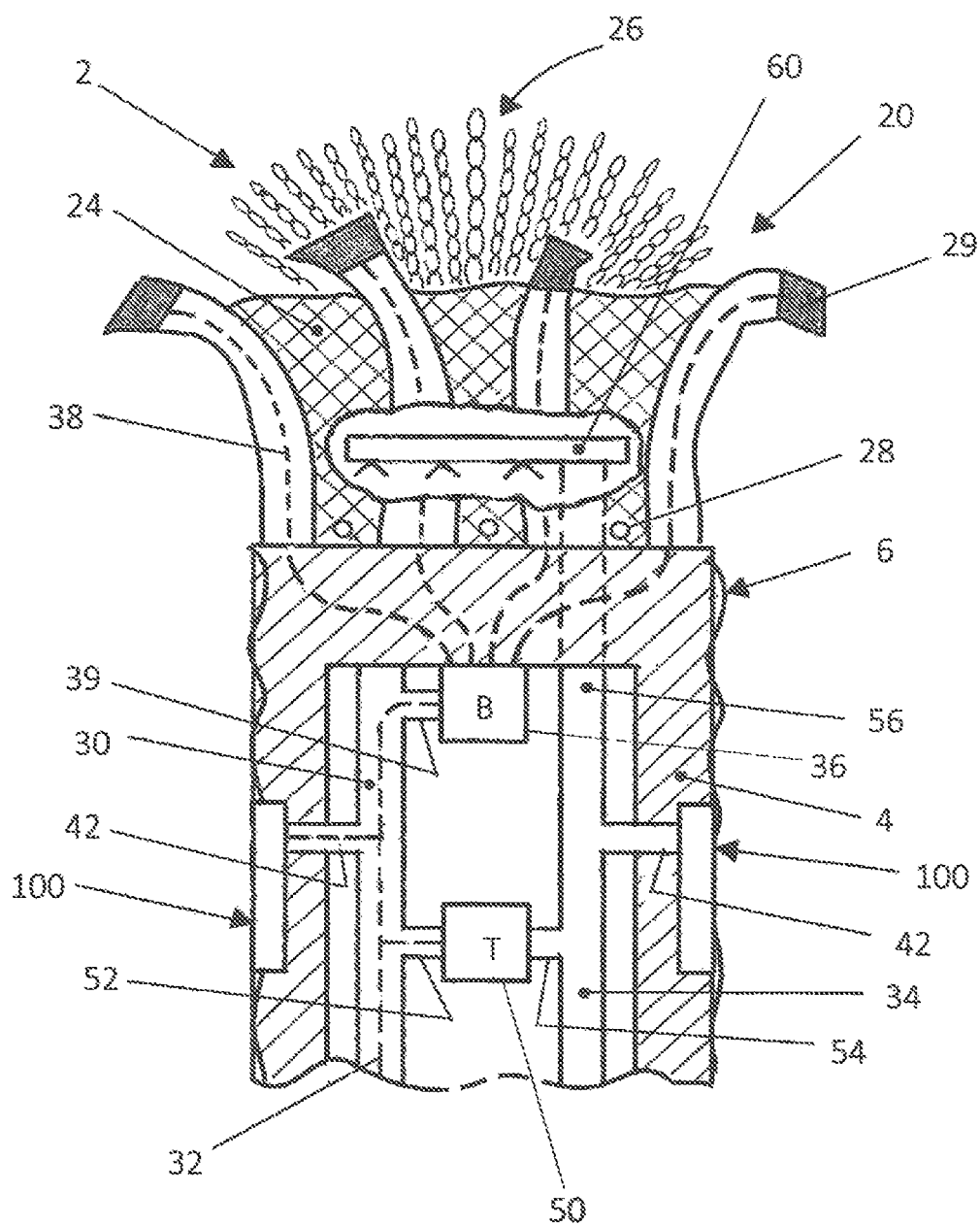
FIG. 3 is an expanded view of the top portion of the simulated tree trunk planter, taken from FIG. 2, constructed according to the present invention.

Considering now the simulated tree trunk planter 2, in greater detail with reference to FIG. 2, the simulated tree trunk planter 2 further includes electrical conduit 30 having conventional electrical wiring 32, plumbing conduit 34, energy storage device or battery system 36, electrical wiring 38, battery conduit connector 39, waterproof seal 40 (FIG. 4), panel system conduit connectors 42, timer system 50, timer system electrical conduit connector 52 (FIG. 3), and timer system water conduit connector 54 (FIG. 3).

Considering now the electrical conduit 30, in greater detail with reference to FIG. 2, the electrical conduit 30, preferably, is a conventional tube used to protect and route conventional electrical wiring 32 in simulated tree trunk 4. Preferably, electrical conduit 30 is constructed of any suitable, durable, semi-rigid, flexible material. As shown in FIG. 2, electrical conduit 30 is conventionally attached at one end to external electrical port 16. Electrical conduit 30 is then extended along the entire length of simulated tree trunk 4 where electrical conduit 30 is conventionally attached to simulated tree trunk 4 at the upper end 10 simulated tree trunk 4. It is to be understood that another key concept of the present invention is that electrical conduit 30 should be located along the length of simulated tree trunk 4 in order to provide electrical access to those tree trunk planter attachments that require electricity in order to operate, as will be discussed in greater detail later.

Considering now the plumbing conduit 34, in greater detail with reference to FIG. 2, the plumbing conduit 34, preferably, is a conventional tube used to route water or other liquids to be used in simulated tree trunk 4. Preferably, plumbing conduit 34 is constructed of any suitable, durable, semi-rigid, flexible material. As shown in FIG. 2, plumbing conduit 34 is conventionally attached at one end to external plumbing port 16. Plumbing conduit 30 is then extended along the entire length of simulated tree trunk 4 where plumbing conduit 34 is conventionally attached to simulated tree trunk 4 at the upper end 10 simulated tree trunk 4. It is to be understood that a further key concept of the present invention is that plumbing conduit 34 should be located along the length of simulated tree trunk 4 in order to provide liquid (water) access to those tree trunk planter attachments that require water, as will be discussed in greater detail later.

Considering now the energy storage device or battery system 36, in greater detail with reference to FIG. 2, the energy storage device or battery system 36, preferably, is a conventional energy storage device or battery 36 that can be used in conjunction with solar or photovoltaic panels 29 to provide an alternate power source. In particular, energy storage device or battery system 36 is conventionally attached to conventional electrical wiring 38 at one end of electrical wiring 38. The other end of electrical wiring 38 is conventionally attached to solar or photovoltaic panels 29. Also, energy storage device or battery system 36 is connected to electrical wiring 32 through conventional electrical connector 39. Finally, energy storage device or battery system 36 is conventionally attached to the interior of simulated tree trunk 4 (not shown). In this manner, if electrical power is lost to the tree trunk planter attachments due to a power outage or the like, the energy storage device or battery system 36 can conventionally begin to provide electrical power to the tree trunk planter attachments. It is to be understood that energy storage device or battery system 36 can also be used as the main source of electrical power to tree trunk planter attachments if simulated tree trunk planter 2 is located where there is no readily available direct, external electrical connection to simulated tree trunk planter 2.

Figure 4:
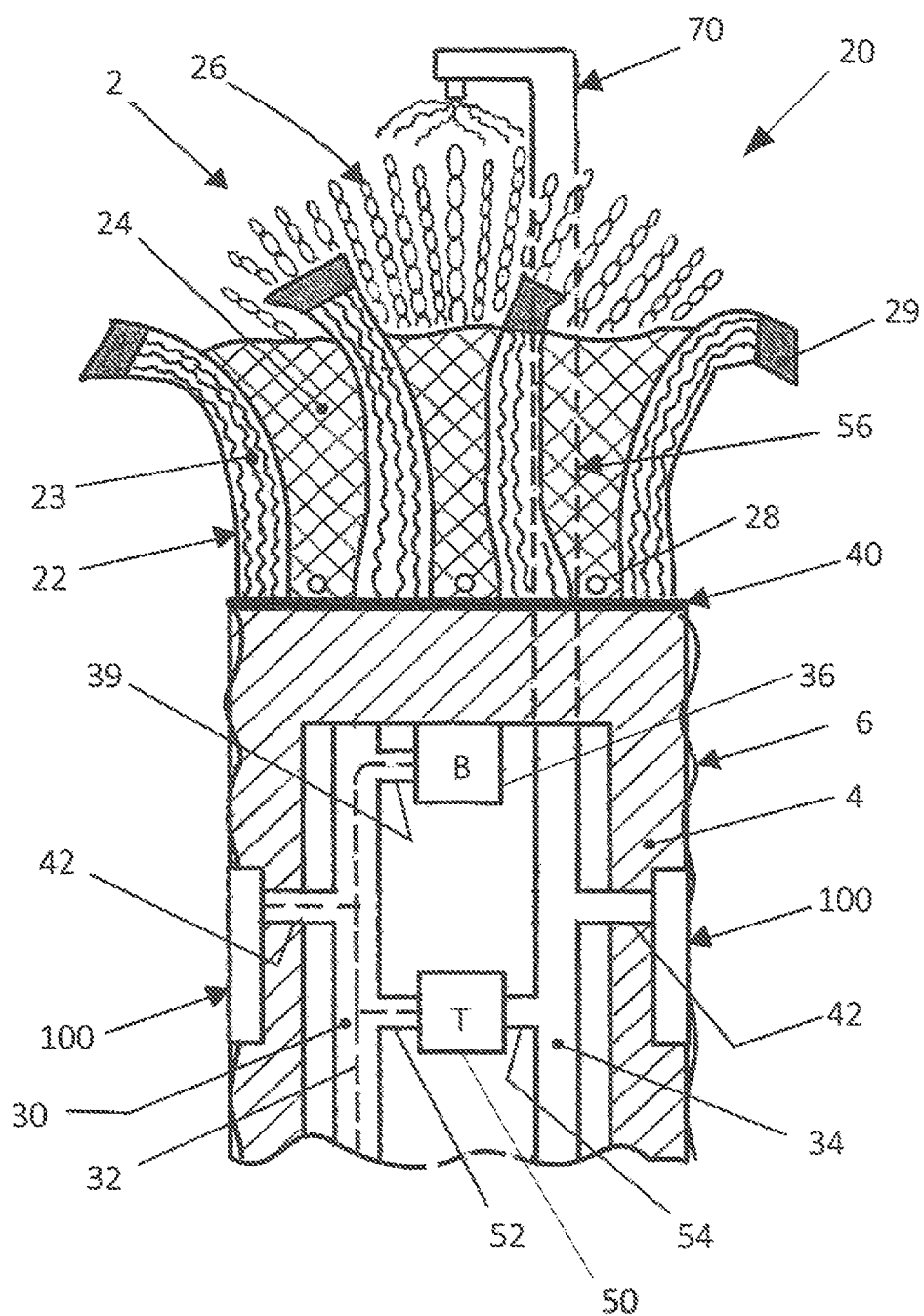
FIG. 4 is another expanded view of the top portion of the simulated tree trunk planter, taken from FIG. 2, which illustrates a plumbing attachment located at the top of the simulated tree trunk planter, constructed according to the present invention.

Considering now the waterproof seal 40, in greater detail with reference to FIG. 4, the waterproof seal 40, preferably, is used to prevent water or other liquids from entering into the inside of simulated tree trunk 4 and coming into contact with electrical wiring 32 and energy storage device or battery system 36. Preferably, waterproof seal 40 is constructed of any suitable, durable, flexible, haze resistant, crack resistant, temperature resistant, wear resistant, UV stabilized, waterproof polymeric material. Preferably, waterproof seal 40 is located between the top of simulated tree trunk 4 and tree top and/or plant 26 in order to prevent any liquids coming off of tree top and/or plant 26 that do not escape through drainage holes 28 from entering into the interior of simulated tree trunk 4.

Considering now the panel system conduit connections 42, in greater detail with reference to FIG. 2, the panel system conduit connections 42, preferably, are used to provide access to electricity and/or water to those tree trunk planter attachments that require electricity and/or water. Preferably, panel system conduit connections 42 are constructed of any suitable, durable, semi-rigid, flexible material. As shown in FIG. 2, panel system conduit connections 42 are conventionally located between tree trunk planter attachment panel systems 100 and electrical conduit 30 and plumbing conduit 34, respectively.

Considering now the simulated tree trunk planter 2, in greater detail with reference to FIG. 3, the simulated tree trunk planter 2 further includes at the upper end 20 of simulated tree trunk planter 2, a water timer system 50 and a water soaking system 60. Water timer system 50 and a water soaking system 60, preferably, are used to provide water or other liquids to tree top and/or plant 26.

Considering now the water timer system 50, in greater detail with reference to FIG. 3, the water timer system 50, preferably, is used to interact with water soaking system 60 to provide a desired amount of water or other liquid to tree top and/or plant 26. Water timer system 50 is conventionally attached to the interior of simulated tree trunk 4. Preferably, water timer system 50 is a conventional system that can be activated for a desired period of time or for a desired amount of liquid (water) in order to properly hydrate the tree top and/or plant 26. As can be seen in FIG. 3, water timer system 50 is conventionally attached to electrical wiring 32 in electrical conduit 30 by electrical connector 52. Also, water timer system 50 is conventionally attached to plumbing conduit 32 by plumbing connector 54. In this manner, electrical power can be supplied to water timer system 50 through a hardwired connection to an external power source through external electrical port 16 (FIG. 1) and/or through an electrical connection to energy storage device or battery 36. Finally, as can be seen in FIG. 3, water timer system 50 can be attached to plumbing conduit 32 in order to shut off the flow of liquid to the tree top and/or plant 26 once the desired amount of liquid has been applied to tree top and/or plant 26.

Considering now the water soaking system 60, in greater detail with reference to FIG. 3, the water soaking system 60, preferably, is used to interact with water timer system 50 to provide a desired amount of liquid, usually water, to tree top and/or plant 26. Preferably, water soaking system 60 is constructed of any suitable durable, flexible, haze resistant, crack resistant, temperature resistant, wear resistant, UV stabilized polymeric material that is capable of dispensing small amounts or drips of liquid to the base of tree top and/or plant 26. As can be seen in FIG. 3, a conventional water system connector 56 is used to conventionally connect water soaking system 60 to water conduit 34.

Considering now the simulated tree trunk planter 2, in greater detail with reference to FIG. 4, the simulated tree trunk planter 2 further includes at the upper end 20 of simulated tree trunk planter 2, a water timer system 50 and a water spraying system 70. Water timer system 50 and a water soaking system 70, preferably, are used to provide water or other liquids to tree top and/or plant 26 in a similar manner as was described above with respect to FIG. 3; however, in this embodiment, the liquid is sprayed on top of tree top and/or plant 26. It is to be understood that water timer system 50 acts in a similar manner as was described with respect to FIG. 3 in that water timer system 50 is used to control the amount of liquid, usually water, that is being applied to tree top and/or plant 26. However, in this embodiment, water spraying system 70 is utilized. Preferably, water spraying system 70 is constructed of any suitable durable, rigid, haze resistant, crack resistant, temperature resistant, wear resistant, UV stabilized polymeric material that is capable of spraying liquid onto tree top and/or plant 26. As can be seen in FIG. 4, the conventional water system connector 56 can also be used to conventionally connect water spraying system 70 to water conduit 34.

Figure 5:
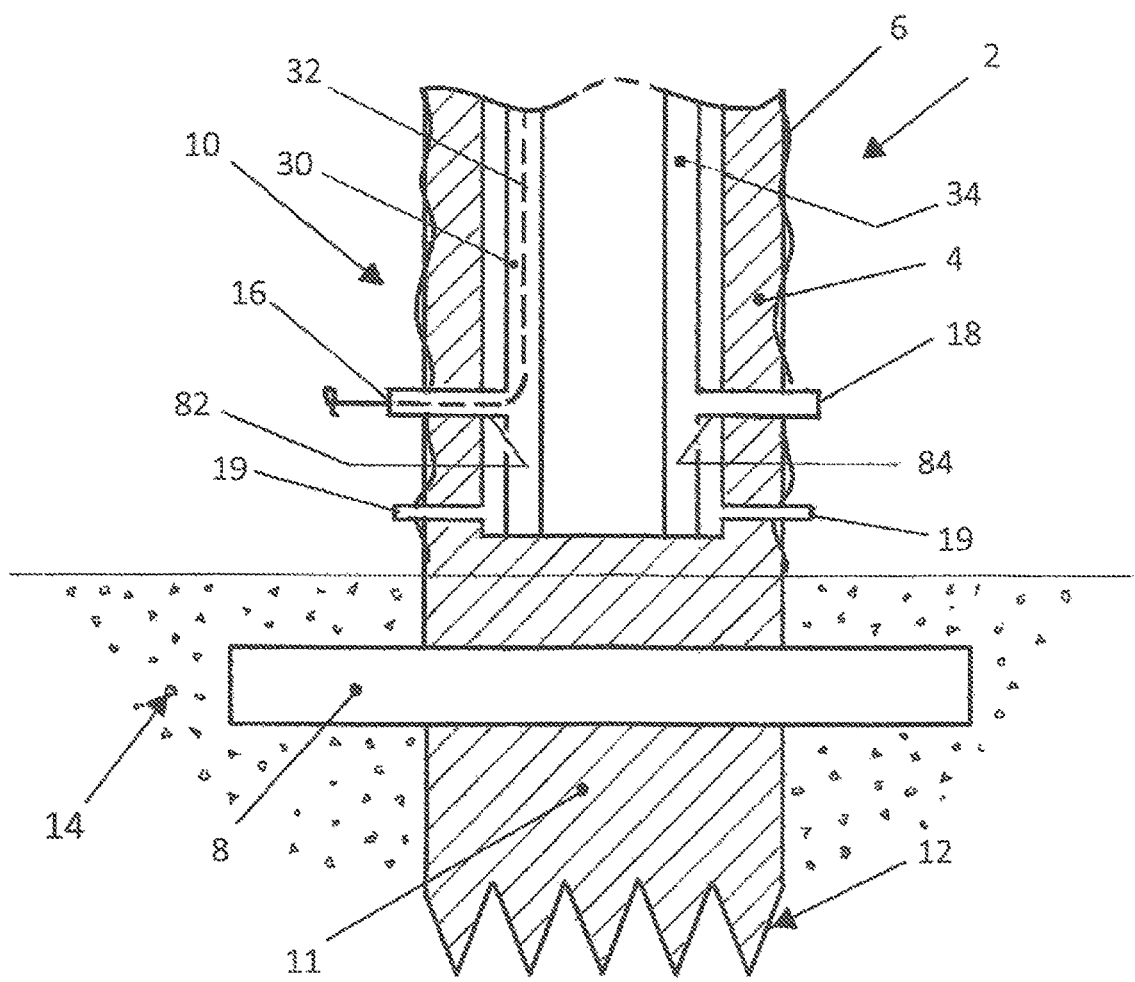
FIG. 5 is an expanded view of the bottom portion of the simulated tree trunk planter, taken from FIG. 2, constructed according to the present invention.

Considering now the simulated tree trunk planter 2, in greater detail with reference to FIG. 5, the simulated tree trunk planter 2 further includes at the lower end 10 of simulated tree trunk 4, an electrical conduit connection 82 and a plumbing conduit connection 84. As can be seen in FIG. 5, electrical conduit connection 82 conventionally connects electrical conduit 30 having electrical wiring 32 to external electrical port 16. Also, plumbing conduit connection 84 conventionally connects plumbing conduit 34 to external plumbing port 18. In this manner, an external power source and an external water source can be connected to simulated tree trunk 4.

Figure 6:
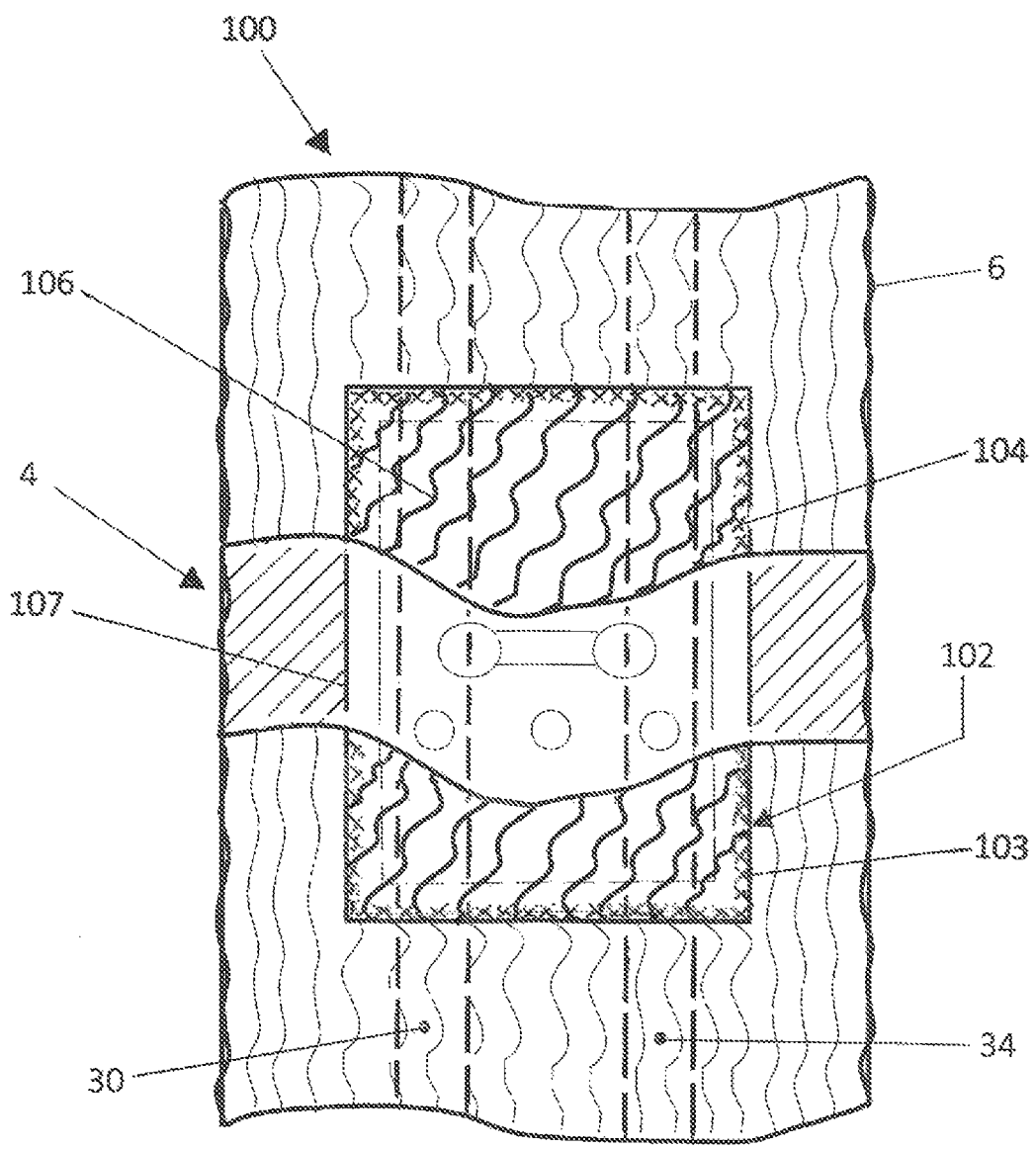
FIG. 6 is a partial cut away frontal view of the plumbing/electrical connection panel, constructed according to the present invention.

Considering now the tree trunk planter attachment panel system 100, in greater detail with reference to FIG. 6, the simulated tree trunk planter 2 further includes along a section of simulated tree trunk 4, the tree trunk planter attachment panel systems 100. Each of the tree trunk planter attachment panel systems 100 includes attachment panel 102, tree trunk opening 103, attachment panel seal 104, attachment panel natural appearance 106 and attachment panel box 107. Tree trunk planter attachment panel system 100 is used to attach a variety of tree trunk planter attachments to simulated tree trunk 4, as will be discussed in greater detail later. As shown in FIG. 6, attachment panel 102 is located on the outside of tree trunk planter attachment panel system 100 such that attachment panel 102 is located over tree trunk opening 103. Preferably, attachment panel 102 is constructed of any suitable durable, rigid, haze resistant, crack resistant, temperature resistant, wear resistant, UV stabilized material that is capable of covering opening 103 in simulated tree trunk 4. It is to be understood that attachment panel 102 may also include natural appearance 106 which is applied to attachment panel 102 by conventional techniques. It is to be further understood that natural appearance 106 is similar to natural appearance 6 in terms of how natural appearance 106 is constructed and the actual look and feel of natural appearance 106. It is to be even further understood that natural appearance 106 should closely resemble the look and feel of natural appearance 6.

Considering now the attachment panel seal 104, in greater detail with reference to FIG. 6, the attachment panel seal 104 is located on a back side of attachment panel 102 and around the perimeter of opening 103 in simulated tree trunk 4. Preferably, attachment panel seal 104 is used to provide a weatherized seal so as to substantially prevent any moisture and/or debris from entering into simulated tree trunk 4 through attachment panel 102 and into opening 103 and attachment panel box 107. Preferably, attachment panel seal 104 is constructed of any suitable durable, flexible, haze resistant, crack resistant, temperature resistant, wear resistant, and UV stabilized polymeric material.

Figure 7:
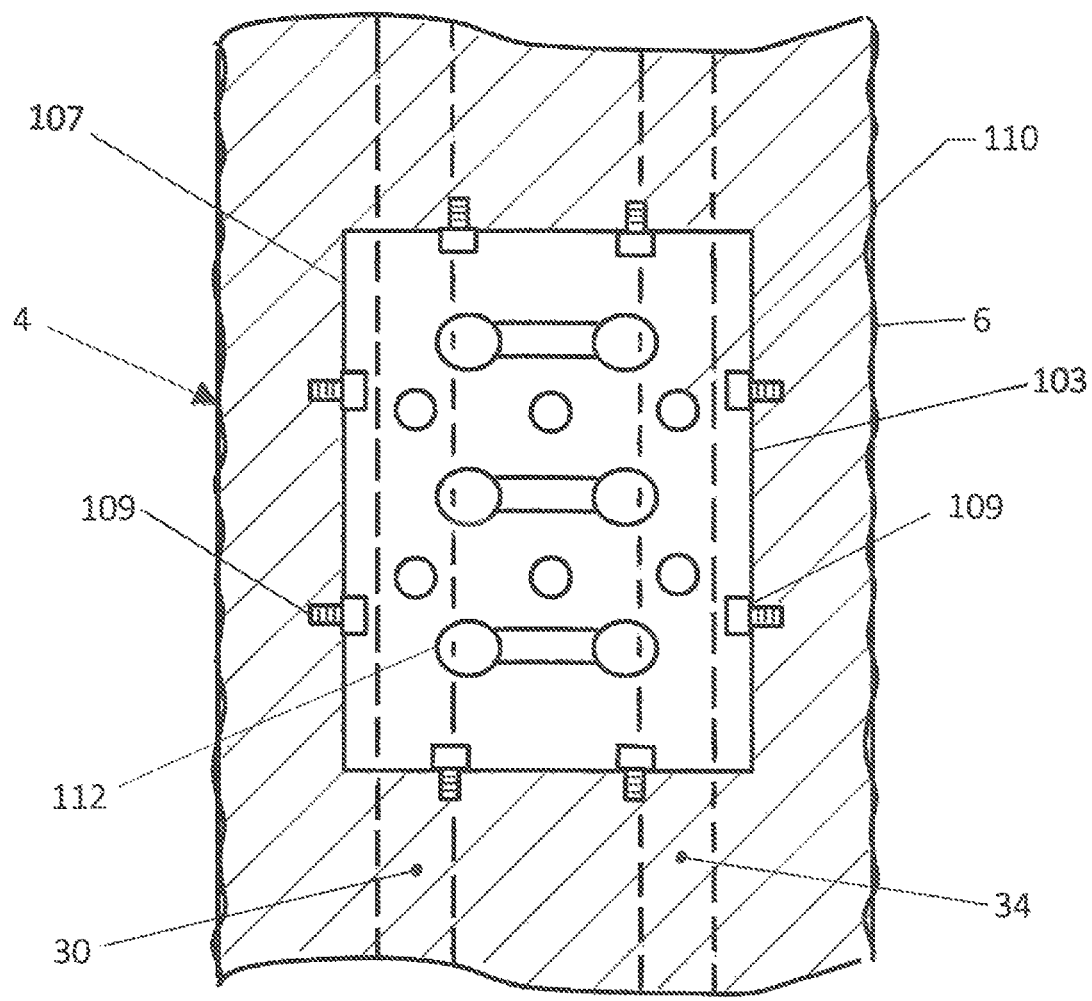
FIG. 7 is a front view of the simulated tree trunk planter with the plumbing/electrical connection panel removed, constructed according to the present invention.

Considering now the attachment panel box 107, in greater detail with reference to FIG. 7, the attachment panel box 107 further includes simulated tree trunk attachment opening 103, simulated tree trunk fasteners 109, panel box attachment openings 110 and panel box attachment slotted openings 112. Preferably, attachment panel box 107 is used to attach the variety of simulated tree trunk attachments to simulated tree trunk 4. Preferably, attachment panel box 107 is constructed of any suitable durable, rigid, haze resistant, crack resistant, temperature resistant, wear resistant, and UV stabilized material. It is to be understood that the overall dimensions of attachment panel box 107 can vary based upon the size of the simulated tree trunk attachments that are to be secured to simulated tree trunk 4.

As shown in FIG. 7, simulated tree trunk fasteners 109 are used to conventionally secure attachment panel box 107 to simulated tree trunk 4. It is to be understood that the number of simulated tree trunk fasteners 109 needed to properly secure attachment panel box 107 to simulated tree trunk 4 will depend upon the size of attachment panel box 107 and the size and weight of the simulated tree trunk attachments that are to be secured to simulated tree trunk 4.

Considering now the panel box attachment openings 110 and panel box attachment slotted openings 112, in greater detail with reference to FIG. 7, the panel box attachment openings 110 and panel box attachment slotted openings 112 are used to secure the simulated tree trunk attachments to the attachment panel box 107. As can be seen in FIG. 7, conventional fasteners (not shown) can be used to conventionally secure the simulated tree trunk attachments to the attachment panel box 107 at panel box attachment openings 110. Also, conventional fasteners (not shown) located on the back of simulated tree trunk attachments can be used to conventionally secure the simulated tree trunk attachments to the attachment panel box 107 at panel box attachment slotted openings 112.

Figure 8:
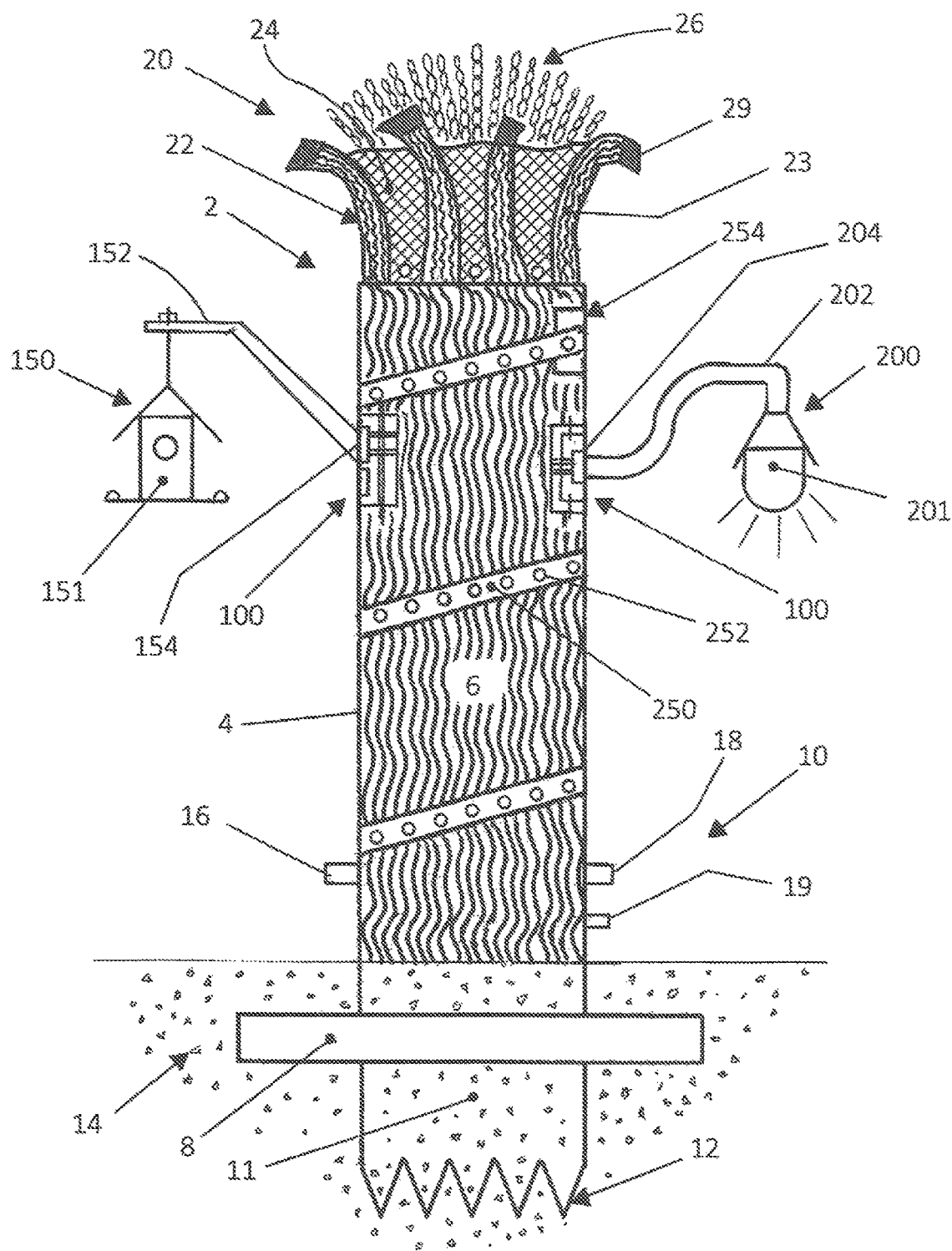
FIG. 8 is a front view of a simulated tree trunk planter having a natural appearance with a variety of attachments located on the simulated tree trunk planter, constructed according to the present invention.
Figure 9:
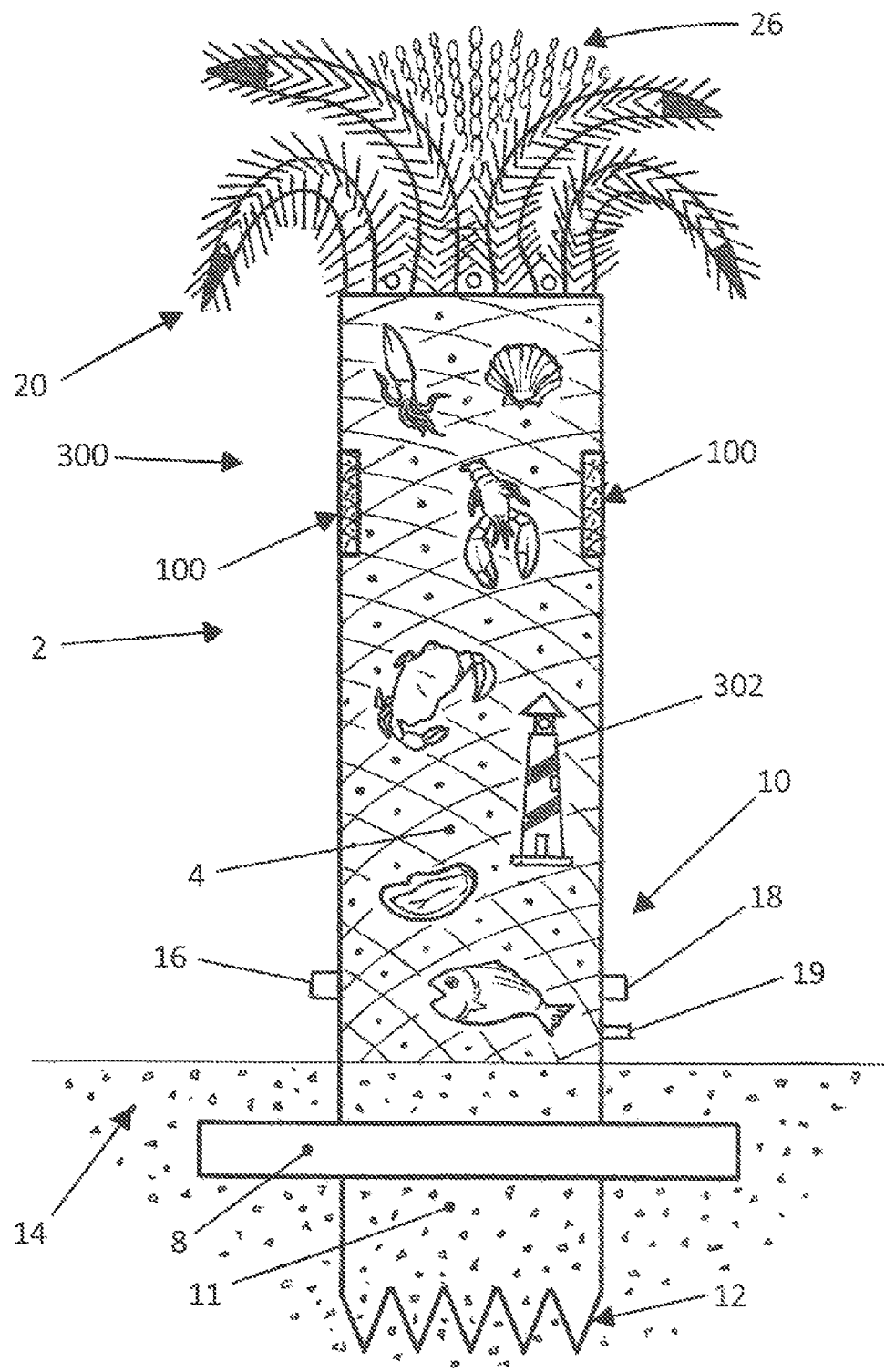
FIG. 9 is a front view of another simulated tree trunk planter, constructed according to the present invention.

Considering now the simulated tree trunk planter 2, in greater detail with reference to FIG. 8, simulated tree trunk planter 2 includes a variety of simulated tree trunk attachments. As shown in FIG. 8, the simulated tree trunk attachments include, but are not limited to, a bird house attachment system 150, street lighting attachment system 200 and light emitting diode (LED) lighting attachment system 250. As discussed above, it is to be understood that a variety of electrical simulated tree trunk attachments can be attached to simulated tree trunk 4 along with a variety of simulated tree trunk attachments that use water such as sprayers, misters, or the like.

Considering now the bird house attachment system 150, in greater detail with reference to FIG. 8, bird house attachment system 150 includes conventional bird house 151, extension 152 and bird house attachment panel 154. Extension 152 is used to attach bird house 151 to bird house attachment panel 154. Preferably, extension 152 is constructed of any suitable durable, rigid, haze resistant, crack resistant, temperature resistant, wear resistant, and UV stabilized material. Bird house attachment panel 154 is conventionally attached to extension 152. Preferably, bird house attachment panel 154 is constructed of any suitable durable, rigid, haze resistant, crack resistant, temperature resistant, wear resistant, and UV stabilized material. As discussed earlier, conventional fasteners (not shown) are used to conventionally attach bird house attachment panel 154 to panel box 107 (FIG. 7) by attaching bird house attachment panel 154 to at least one of the panel box attachment openings 110 and/or least one of the panel box attachment slotted openings 112.

Considering now the street lighting attachment system 200, in greater detail with reference to FIG. 8, street lighting attachment system 200 includes conventional street light 201, extension 202 and street light attachment panel 204. Extension 202 is used to attach street light 201 to street light 201 attachment panel 204. Preferably, extension 202 is constructed of any suitable durable, rigid, haze resistant, crack resistant, temperature resistant, wear resistant, and UV stabilized material. Street light attachment panel 204 is conventionally attached to extension 202. Preferably, street light attachment panel 204 is constructed of any suitable durable, rigid, haze resistant, crack resistant, temperature resistant, wear resistant, and UV stabilized material. As discussed earlier, conventional fasteners (not shown) are used to conventionally attach street light attachment panel 204 to panel box 107 by attaching street light attachment panel 204 to at least one of the panel box attachment openings 110 and/or at least one of the panel box attachment slotted openings 112. As discussed earlier, it is to be further understood that street lighting attachment system 200 is conventionally attached to wiring 32 (FIGS. 3 and 4) through panel system conduit connections 42 so that electric power can be provided to operate street light 201.

Considering now the light emitting diode (LED) lighting attachment system 250, in greater detail with reference to FIG. 8, light emitting diode (LED) lighting attachment system 250 includes a conventional strip of light emitting diodes (LEDs) 252 and a LED attachment panel 254. It is to be understood that light emitting diode (LED) lighting attachment system 250 is conventionally attached to trunk 4 by any number of well-known attachment devises. Preferably, LED attachment panel 254 is constructed of any suitable durable, rigid, haze resistant, crack resistant, temperature resistant, wear resistant, and UV stabilized material. As discussed earlier, conventional fasteners (not shown) are used to conventionally attach LED attachment panel 254 to panel box 106 by attaching the LED attachment panel 254 to at least one of the panel box attachment openings 110 and/or at least one of the panel box attachment slotted openings 112. As discussed earlier, it is to be further understood that LED lighting attachment system 250 is conventionally attached to wiring 32 (FIGS. 3 and 4) through panel system conduit connections 42 so that electric power can be provided to operate LED strip 252.

Considering now the simulated tree trunk planter 300, in greater detail with reference to FIG. 8, simulated tree trunk planter 300 includes a variety of simulated shapes and/or designs 302 that are associated with the seashore and/or sea life. It is to be understood that simulated tree trunk planter 300 is constructed in substantially the same manner as simulated tree trunk planter 2 including the ability to be able to include simulated tree trunk attachments, except natural appearance 6 has been replaced with the seashore and/or sea life shapes and/or designs 302.

Considering now the method of using simulated tree trunk planter 2 and simulated tree trunk planter 300, the end user first determines the site where the simulated tree trunk planter 2, 300 is to be located. Once the site is determined, the end user then determines the type of trees top and/or plants 26 that are to be planted onto the top 20 of simulated tree trunk planter 2 and simulated tree trunk planter 2, 300.

Upon determining the location of simulated tree trunk planter 2, 300 and the types of tree top and/or plants 26 to be located on the top of simulated tree trunk planter 2, 300, the end user can then determine the size of stabilizing plate 8 and tree anchor 11 having tree anchor teeth 12 which will be needed in order to properly stabilize simulated tree trunk 4 within terrain 14.

The end user can then determine the type of natural appearance 6 that will be needed to be applied to simulated tree trunk 4, the type of natural appearance 23 that will need to be applied to receptacle retainers 22, and the type of natural appearance 106 that will be needed to be applied to attachment panels. For example, if the end user desires to make simulated tree trunk 4 look like a hardwood tree such as an oak tree, then the natural appearances 6, 23 and 106 should be made to substantially look like the bark of an oak tree.

After the natural appearance has been determined, the end user will then determine the type and amount of simulated tree trunk attachments that will be attached to simulated tree trunk 4. Once the type and amount of simulated tree trunk attachments have been determined, the end user must decide where along simulated tree trunk 4 the simulated tree trunk attachments are to be located. This is an important step in that the end user must then determine if either or both of the electrical conduit 30 and the plumbing conduit 34 need to accessed in order to provide electricity and/or liquid such as water to the simulated tree trunk attachments.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

Therefore, provided herein is a new and improved simulated tree trunk planter and a novel method of using the simulated tree trunk planter. The preferred simulated tree trunk planter, according to various embodiments of the present invention, offers the following advantages: ease of use; portability; lightness in weight; a natural appearance; the ability to use a variety of electrical attachments; the ability to use a variety of plumbing attachments; the ability to be able to customize the simulated tree planter; the ability to use the simulated tree planter in a variety of different climates; and the ability to use the simulated tree planter in a variety of different terrains. In fact, in many of the preferred embodiments, these factors of ease of use, portability, lightness in weight, a natural appearance, the ability to use a variety of electrical attachments, the ability to use a variety of plumbing attachments, the ability to be able to customize the simulated tree planter, the ability to use the simulated tree planter in a variety of different climates, and the ability to use the simulated tree planter in a variety of different terrains are optimized to an extent that is considerably higher than heretofore achieved in prior, known simulated tree trunk planters.

I claim:

1. A planting container with the simulated look of a natural tree, comprising:

a simulated tree trunk having a lower end and an upper end such that the simulated tree trunk includes a natural appearance located on an outer surface of the simulated tree trunk, wherein the natural appearance makes the simulated tree trunk appear to look like a real life tree, wherein the simulated tree trunk includes at least one electrical conduit located within an interior of the simulated tree trunk such that the at least one electrical conduit extends from the lower end to the upper end and includes electrical wiring located within the at least one electrical conduit and at least one plumbing conduit located within the interior of the simulated tree trunk such that the at least one plumbing conduit extends from the lower end to the upper end;

wherein the lower end includes a stabilizing plate operatively connected at one side to the lower end of the simulated tree trunk and a tree anchor operatively connected at one end to other side of the stabilizing plate, wherein the stabilizing plate and the tree anchor are located below a sufficient amount of terrain to assist in creating the natural appearance that makes the simulated tree trunk appear to look like a real life tree and such that any movement of simulated tree trunk will be minimized through the use stabilizing plate and the tree anchor, wherein a width of the stabilizing plate can be adjusted and a width of the tree anchor can be adjusted;

wherein the upper end includes a simulated tree trunk planter receptacle having receptacle retainers, a receptacle lattice operatively connected to the receptacle retainers, and foliage such that the foliage is retained in place by the receptacle retainers and the receptacle lattice; and a plurality of tree trunk planter attachment panel systems located on a section of the simulated tree trunk, wherein a plurality of tree trunk planter attachments is secured to the simulated tree trunk through the use of the plurality of tree trunk planter attachment panel systems, wherein at least one of the plurality of tree trunk planter attachment panel systems includes an attachment panel having a first side such that the first side includes a natural appearance that is similar to the natural appearance of the simulated tree trunk, an attachment panel seal operatively connected to a second side of the attachment panel and positioned around a perimeter of the second side of the attachment panel, and an attachment box operatively connected to the simulated tree trunk and located adjacent to the second side of the attachment panel such that the attachment box contacts the attachment panel seal, wherein the attachment box includes a plurality of openings and slotted openings such that at least one of the plurality of tree trunk planter attachments can be secured to the attachment box through the use of the plurality of openings and slotted openings.

2. The planting container with the simulated look of a natural tree, as in claim 1, wherein the lower end is further comprised of:
- at least one external electrical port located on the outer surface of the simulated tree trunk and operatively connected to the at least one electrical conduit;
- at least one external plumbing port located on the outer surface of the simulated tree trunk and operatively connected to the at least one plumbing conduit; and
- at least one drainage hole.

3. The planting container with the simulated look of a natural tree, as in claim 1, wherein the upper end is further comprised of:
- a plurality of photovoltaic panels each located on one end of each of the plurality of receptacle retainers;
- a battery located within the interior of the simulated tree trunk and operatively connected to the plurality of photovoltaic panels and the at least one electrical conduit; and
- a timer located within the interior of the simulated tree trunk and operatively connected to the battery, the at least one electrical conduit, and the at least one plumbing conduit.

4. The planting container with the simulated look of a natural tree, as in claim 1, wherein the stabilizing plate is a circular plate.

5. The planting container with the simulated look of a natural tree, as in claim 1, wherein the tree anchor is further comprised of a plurality of teeth operatively connected at an end of tree anchor.

6. The planting container with the simulated look of a natural tree, as in claim 1, wherein the upper end is further comprised of:
- a plurality of tree trunk planter receptacles having an outer surface that includes the natural appearance, wherein the plurality of tree trunk planter receptacles includes a plurality of receptacle retainers, receptacle lattice, a liquid applicator, and a plurality of planter receptacle drainage holes, wherein the receptacle lattice is operatively connected to the plurality of receptacle retainers such that foliage can be located within the plurality of tree trunk planter receptacles and retained by the plurality of receptacle retainers and receptacle lattice; and
- a waterproof seal located between the plurality of tree trunk planter receptacles and the upper end of the simulated tree trunk.

7. The planting container with the simulated look of a natural tree, as in claim 6, wherein the liquid applicator is further comprised of:
- a water drip hose.

8. The simulated tree trunk planter, as in claim 1, wherein the plurality of tree trunk planter attachments is further comprised of:
- a street light system.

9. The simulated tree trunk planter, as in claim 1, wherein the plurality of tree trunk planter attachments is further comprised of:
- a bird house attachment system.

10. The simulated tree trunk planter, as in claim 1, wherein the plurality of tree trunk planter attachments is further comprised of:
- a light emitting diode (LED) lighting attachment system.

* * * * *